United States Patent
Ha

(10) Patent No.: US 7,684,486 B2
(45) Date of Patent: Mar. 23, 2010

(54) METHOD FOR MOTION COMPENSATED INTERPOLATION USING OVERLAPPED BLOCK MOTION ESTIMATION AND FRAME-RATE CONVERTER USING THE METHOD

(75) Inventor: Tae-hyeun Ha, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1443 days.

(21) Appl. No.: 11/053,940

(22) Filed: Feb. 10, 2005

(65) Prior Publication Data

US 2005/0175102 A1    Aug. 11, 2005

(30) Foreign Application Priority Data

Feb. 11, 2004  (KR) ............... 10-2004-0009021

(51) Int. Cl.
*H04N 7/12*  (2006.01)
(52) U.S. Cl. .................. 375/240.16; 375/240.24
(58) Field of Classification Search ......... 348/441, 348/459, 448, 699; 375/240.16, 240.24
See application file for complete search history.

(56) References Cited

U.S. PATENT DOCUMENTS

| | | | |
|---|---|---|---|
| 5,142,360 A | | 8/1992 | Niihara |
| 5,162,907 A | * | 11/1992 | Keating et al. ......... 375/240.16 |
| 5,337,154 A | * | 8/1994 | Dorricott et al. ............ 348/448 |
| 5,398,079 A | * | 3/1995 | Liu et al. ..................... 348/699 |
| 5,642,170 A | * | 6/1997 | Hackett et al. .............. 348/459 |
| 6,229,570 B1 | * | 5/2001 | Bugwadia et al. ........... 348/441 |
| 6,343,099 B1 | | 1/2002 | Ogura |
| 6,900,846 B2 | * | 5/2005 | Lee et al. ..................... 348/459 |

FOREIGN PATENT DOCUMENTS

| | | |
|---|---|---|
| JP | 2002-94987 A | 3/2002 |
| KR | 1999-016084 A | 3/1999 |
| KR | 2003-0020466 A | 3/2003 |
| KR | 2003-0039815 A | 5/2003 |

* cited by examiner

*Primary Examiner*—Gims S Philippe
(74) *Attorney, Agent, or Firm*—Sughrue Mion, PLLC

(57) ABSTRACT

A method for motion compensated interpolation using overlapped block motion estimation and a frame-rate converter using the method, wherein the method includes storing an input image in frame units, dividing the stored image into $N_1 \times N_2$ blocks and $M_1 \times M_2$ blocks that are larger than the $N_1 \times N_2$ blocks based on the same center axis as that of the $N_1 \times N_2$ blocks and overlapped with adjacent blocks and sampling pixels in the $M_1 \times M_2$ blocks, estimating a motion vector by matching the sampled $M_1 \times M_2$ blocks between adjacent frames, and creating a median pixel value between the adjacent frames using the estimated motion vector and pixel values of the matched $N_1 \times N_2$ blocks between the adjacent frames.

8 Claims, 4 Drawing Sheets

US 7,684,486 B2

METHOD FOR MOTION COMPENSATED INTERPOLATION USING OVERLAPPED BLOCK MOTION ESTIMATION AND FRAME-RATE CONVERTER USING THE METHOD

BACKGROUND OF THE INVENTION

This application claims priority from Korean Patent Application No. 2004-9021, filed on Feb. 11, 2004 in the Korean Intellectual Property Office, the disclosure of which is incorporated herein in its entirety by reference.

1. Field of the Invention

The present invention relates to a frame-rate converting system, and more particularly, to a method for motion compensated interpolation using overlapped block motion estimation and a frame-rate converter using the method.

2. Description of the Related Art

Conventionally, in personal computers (PC) or high-definition televisions (HDTV), frame rate conversion is performed for compatibility between programs having various broadcasting signal standards such as PAL or NTSC. Frame rate conversion means conversion of the number of frames that are output per second. In particular, when a frame rate is increased, interpolation of a new frame is required. With the recent development of broadcasting techniques, frame rate conversion is performed after video data is compressed according to video compression schemes such as Moving Picture Experts Group (MPEG) or H.263.

Since video signals between frames mostly have high auto-correlation, they have redundancy. Thus, the efficiency of data compression can be improved by removing such redundancy in data compression. At this time, to efficiently compress video frames that temporally change, it is necessary to remove redundancy in the direction of a time axis. In other words, by replacing a frame having little or no motion with respect to a previous frame, it is possible to largely reduce the amount of data to be transmitted. Motion estimation (ME) is a task of searching for the most similar blocks between a previous frame and a current frame. A motion vector (MV) indicates a magnitude of block's movement in ME.

In general, motion estimation methods use a block matching algorithm (BMA) based on the accuracy, the possibility of real-time processing, and hardware implementation.

The BMA divides a seamless input video into pixel blocks of a predetermined size, searches for the most similar block of each of the divided pixel blocks in a previous or future frame, and determines the found block as an MV. To determine similarity between adjacent blocks, mean absolute differences (MADs) are usually used in the BMA.

Also, video signals that are to be inserted between frames are created using the BMA. FIG. 1 shows motion compensated interpolation between frames using the BMA.

In FIG. 1, when pixel values of blocks B included in frames $F_n$, $F_{n-}$, and $F_i$ are $f_n$, $f_{n-1}$, and $f_i$ and a coordinate value included in the frame $F_n$ is x, a video signal to be motion compensation interpolated can be expressed as follows in Equation 1.

$$f_i(x+MV(x)/2) = \{f_n(x) + f_{n-1}(x+MV(x))\} \div 2 \quad (1)$$

Such BMA is suitable for real-time processing, and thus, is used not only in frame rate conversion but also in compression standards such as MPEG2/4 and H.262/264. The BMA shows excellent performance in motion estimation having horizontal/vertical components, but shows inferior performance in rotation or reduction of videos. Therefore, to improve the accuracy using the BMA, the size of a matching block should be increased. However, as a block size increases, the accuracy is improved, but it is difficult to achieve fine expression. As a block size decreases, the amount of computation is decreased and fine expression is possible, but the accuracy is decreased.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non- limiting embodiment of the present invention may not overcome any of the problems described above The present invention provides a method for motion compensated interpolation, which reduces the amount of computation caused by block-based motion estimation and increases precision by performing motion estimation using sampled blocks and performing motion compensated interpolation using non-sampled blocks, and a frame-rate converter using the method.

According to one aspect of the present invention, there is provided a method for motion compensated interpolation, the method comprising: storing an input image in frame units; (b) dividing pixels of the stored image into $N_1 \times N_2$ blocks and $M_1 \times M_2$ blocks based on the same center axis and sampling pixels in the $M_1 \times M_2$ blocks, wherein $N_1$, $N_2$, $M_1$ and $M_2$ are positive integers, the $M_1 \times M_2$ blocks are larger than the $N_1 \times N_2$ blocks, and adjacent $M_1 \times M_2$ blocks are overlapped with each other; estimating a motion vector by matching sampled pixels of the $M_1 \times M_2$ blocks between adjacent frames; and creating a mean pixel value between the adjacent frames using the motion vector and pixel values of matched $N_1 \times N_2$ blocks between the adjacent frames.

According to another aspect of the present invention, there is provided a frame-rate converter that divides pixels of a frame into N1×N2 blocks and M1×M2 blocks that are larger than the N×N blocks based on the same center axis as that of the N×N blocks and converts a frame rate, wherein N1, N2, M1 and M2 are positive integers and the M1×M2 blocks are larger than the N1×N2 blocks, the frame-rate coverter comprising: a frame buffer storing which stores an input image in frame units having the N1×N2 blocks and the M1×M2 blocks; a motion estimation unit sampling which samples pixels of the M1×M2 blocks stroedstored in the frame buffer and estimates a motion vector by matching the M1×M2 blocks between adjacent frames; and a motion compensated interpolation unit creating which generates a median pixel value between the adjacent frames based on the motion vector estimated in the motion estimation unit and the pixels of the N1×N2 blocks stored in the frame buffer.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF ILLUSTRATIVE, NON-LIMITING EMBODIMENTS OF THE INVENTION

Figure 1:
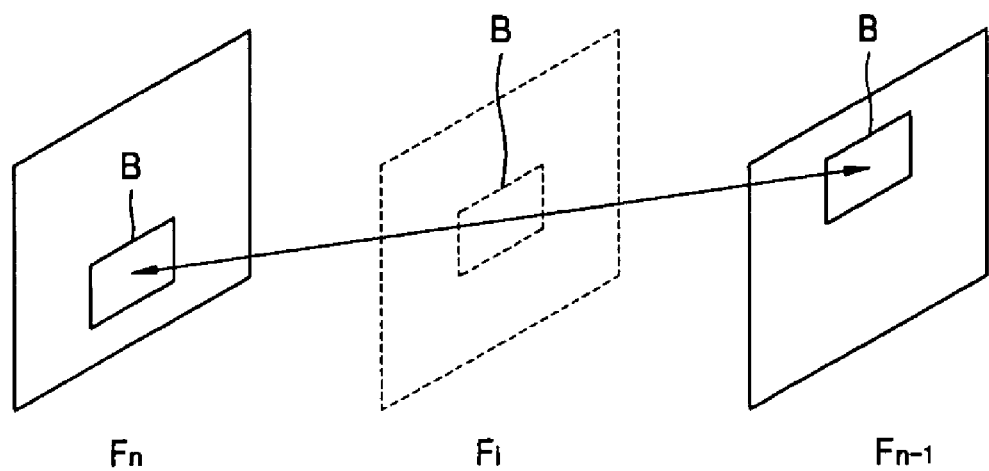
FIG. 1 is a conceptual view of conventional motion compensated interpolation.
Figure 2:
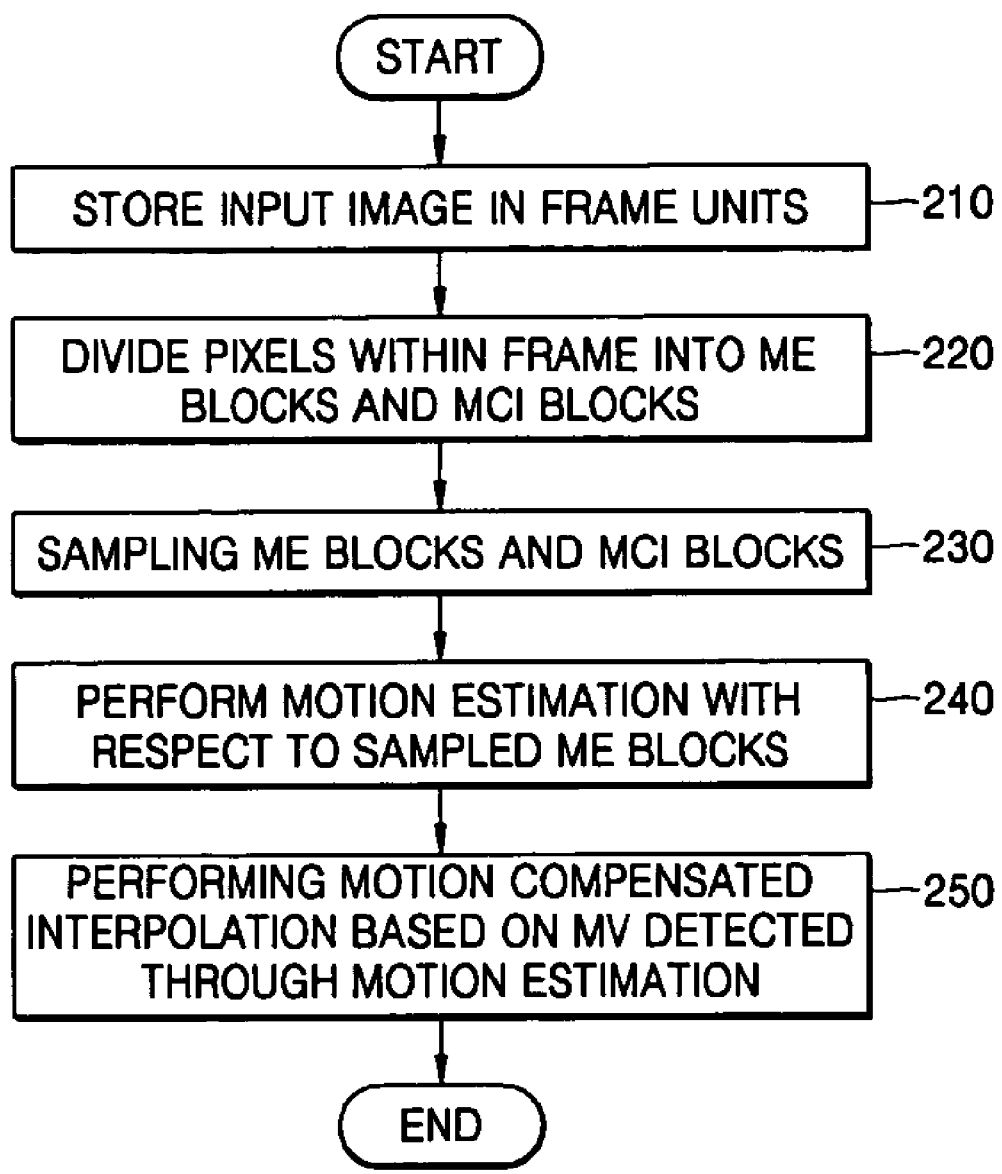
FIG. 2 is a flowchart illustrating a method for motion compensated interpolation according to an exemplary embodiment of the present invention.

FIG. 2 is a flowchart illustrating a method for motion compensated interpolation according to an exemplary embodiment of the present invention.

In operation 210, an input video is stored in frame units.

In operation 220, pixels in an n-1$^{th}$ frame $F_{n-1}$ and a n$^{th}$ frame $F_n$ are divided into motion compensated interpolation (hereinafter, referred to as MCI) blocks of $N_1 \times N_2$ and motion estimation (hereinafter, referred to as ME) blocks of $M_1 \times M_2$ that are larger than the MCI blocks and based on the same center axis as that of the MCI blocks. At this time, $M_1 \times M_2$ are set larger than $N \times N_2$. For example, the size of each ME block may be set to 32×32 and the size of each MCI block may be set to 16×16. However, it is not required that $M_1$ is equal $M_2$ and $N_1$ is equal to $N_2$. Also, a block of $M_1 \times M_2$ is separated horizontally by $N_1$ and vertically by $N_2$ from its left, right, up, and down adjacent blocks. Thus, the ME blocks of $M_1 \times M_2$ are overlapped with adjacent blocks.

In operation 230, pixels in the ME blocks of the n-1$^{th}$ frame $F_{n-1}$ and nth frame $F_n$ are sub-sampled to ½ or less.

Figure 4:
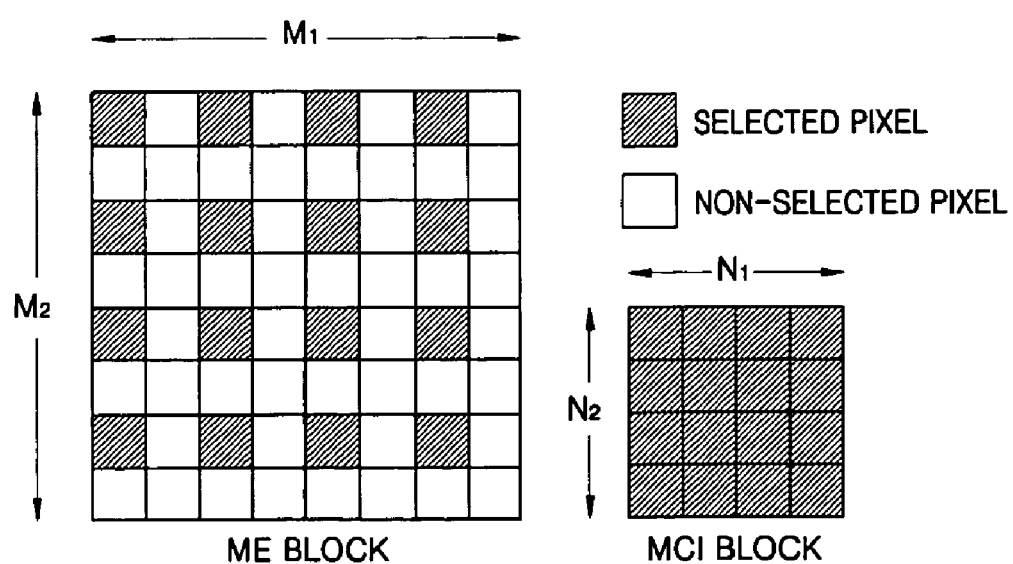
FIG. 4 shows the ME block and the MCI block of FIG. 3.

Referring to FIG. 4, an ME block of $M_1 \times M_2$ and an MCI block of $N_1 \times N_2$ are shown, wherein the ME block of $M_1 \times M_2$ is sub-sampled using a sampling coefficient of 2 and selected pixels and non-selected pixels are separately marked.

In operation 240, the ME block of $M_1 \times M_2$ that is sub-sampled between the n-1$^{th}$ frame $F_{n-1}$ and the n$^{th}$ frame $F_n$ is matched in a backward or forward direction and a motion vector to be applied to a frame Fi that is to be interpolated between frames $F_n$ and $F_{n-1}$ is estimated.

For example, motion estimation using a sampling block will be described with reference to FIG. 3. When the n-1$^{th}$ frame $F_{n-1}$ and the n$^{th}$ frame $F_n$ are given, the MV is determined by calculating MADs between the base blocks in the current frame $F_{n-1}$ and the reference blocks in the previous frame $F_n$ and calculating a spatial distance to a block having the minimum MAD. The MADs are calculated as follows in Equation 2.

$$MAD_{(k,l)}(x, y) = \sum_{i=1}^{N_1} \sum_{j=1}^{N_2} \frac{|f_{n-1}(k+i+x, l+j+y) - f_n(k+i, l+j)|}{N_1 \times N_2}, \quad (2)$$

where n indicates the order of input frames in a time domain, (i, j) indicates spatial coordinates of pixels, (x, y) indicates a spatial distance difference between two blocks to be matched, (k, l) indicates spatial coordinates of two blocks each having $N_1 \times N_2$ pixels, and $N_1$ and $N_2$ respectively indicates a horizontal size and a vertical size of two matched blocks. Also, the MV for the block having the minimum MAD is obtained within an ME area as follows in Equation 3.

$$(x_m, y_m)_{(k,l)} = \arg \min_{(x,y) \in S} \{MAD_{(k,l)}(x, y)\}, \quad (3)$$

where S indicates a search range for ME and $(x_m, y_m)$ indicates the MV for the block having the minimum MAD.

At this time, the MAD obtained using the sampled ME blocks can be expressed as follows in Equation 4.

$$MAD_{(k,l)}(x, y) = \sum_{i=1}^{[M_1/\alpha]} \sum_{j=1}^{[M_2/\alpha]} \frac{\alpha^2 |f_{n-1}(k+\alpha j+y) - f_n(k+\alpha i, l+\alpha j)|}{M_1 \times M_2}, \quad (4)$$

where $\alpha$ indicates a sampling coefficient for the pixels in the ME block, $[M/\alpha]$ is a maximum integer that is not larger than $M/\alpha$, $M_1 \times M_2$ indicates a size of the ME block, and $M_1$ and $M_2$ are set larger than $N_1$ and $N_2$ of Equation 2, respectively. Referring to Equation 4, ME is performed using a block including pixels that are obtained by sampling a block of $M_1 \times M_2$ horizontally and vertically by a sampling coefficient $\alpha$. At this time, by performing ME using the sampled block, the amount of computation can be reduced. For example, assuming that ME is performed for the same video frame, MCI blocks of the same size are used, and the same ME range is used, the amounts of computation required for conventional ME and ME according to the present invention can be compared as follows. When an ME range is S and the amount of computation per pixel for calculation of MADs is K, the amount of computation of an MV for an ME block according to conventional art can be expressed as $SKN_1N_2$ and the amount of computation of an MV for an ME block according to the present invention can be expressed as $SK(M_1M_2/\alpha^2)$.

Figure 3:
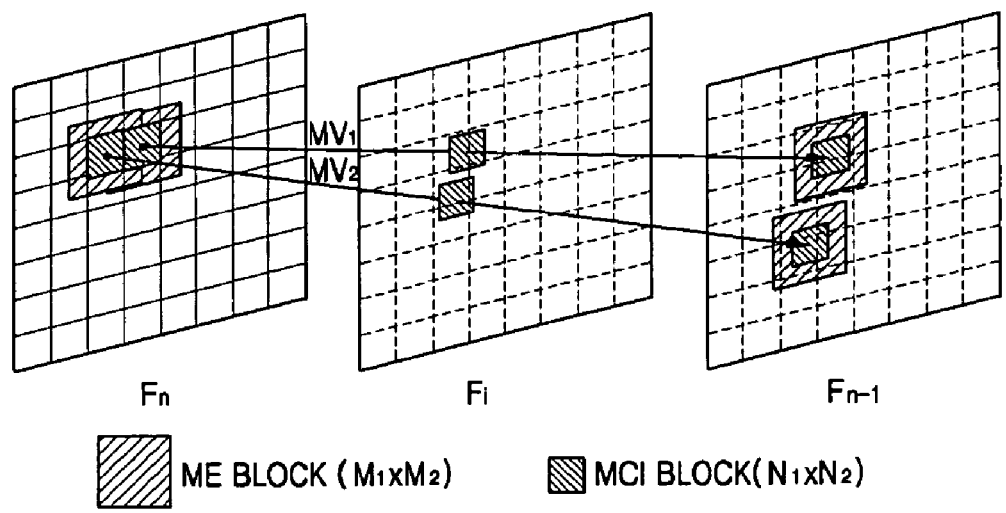
FIG. 3 is a conceptual view of a method for motion compensated interpolation using an ME block and a motion compensated interpolation (MCI) block, according to an exemplary embodiment of the present invention.

Next, in operation 250, a pixel value of the frame $F_i$ to be interpolated is created as shown in FIG. 3 using the MCI blocks between frames based on MVs estimated using the ME blocks. In other words, for example, an interpolated frame is created in such a way that on the assumption that a frame to be interpolated is located in the middle of the n$^{th}$ frame and n-1$^{th}$ frame, if an MV oriented from the n$^{th}$ frame towards the n-1$^{th}$ frame is given, a mean of pixel values of matched points between the n$^{th}$ frame and n-1$^{th}$ frame is calculated as a pixel value of the frame to be interpolated.

The pixel value of the frame to be interpolated can be expressed as follows in Equation 5.

$$f_i(k+i, k+j) = \frac{f_{n-1}\left(k+i-\frac{x_m}{2}, l+j-\frac{y_m}{2}\right) + f_n\left(k+i+\frac{x_m}{2}, l+j+\frac{y_m}{2}\right)}{2} \quad (5)$$

Therefore, the amount of computation required for ME is reduced by estimating an MV using sampled ME blocks and image precision can be improved by performing motion compensated interpolation using an estimated MV and non-sampled MCI blocks.

Figure 5:
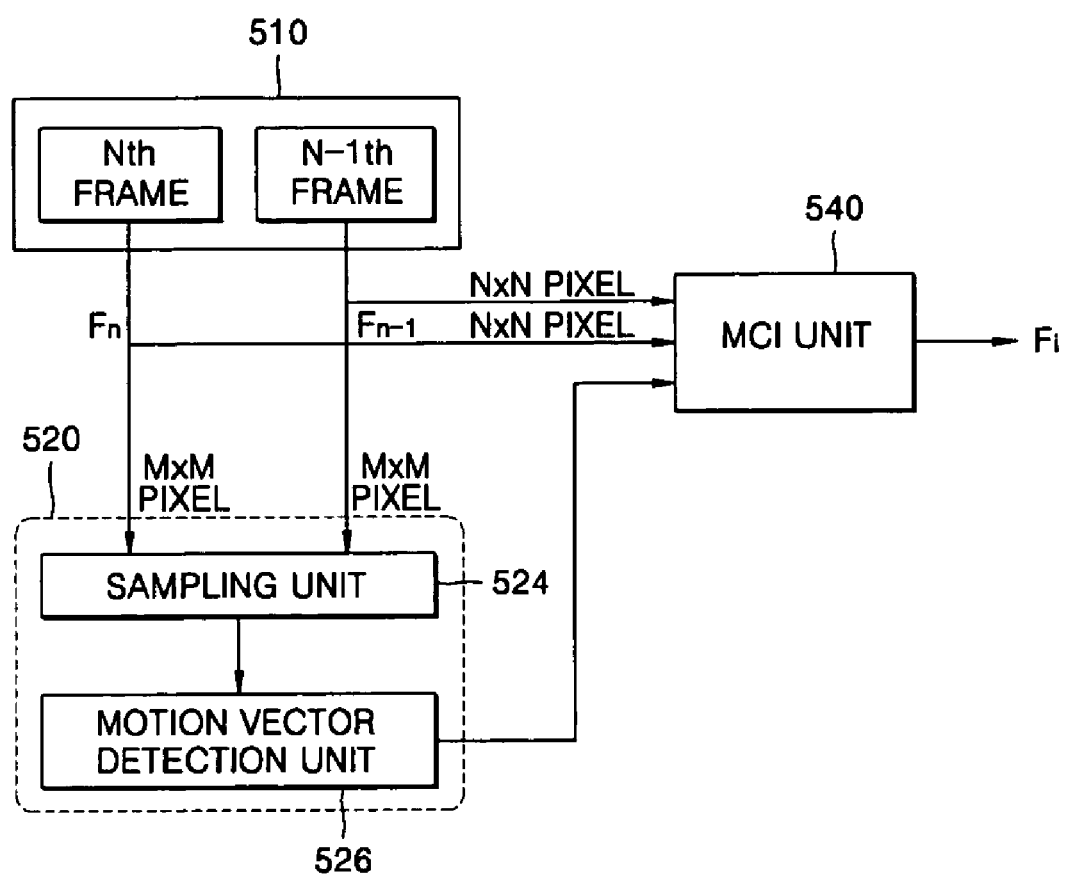
FIG. 5 is a block diagram of a frame-rate converter using the method for motion compensated interpolation according to an exemplary embodiment of the present invention.

FIG. 5 is a block diagram of a frame-rate converter using the method for motion compensated interpolation according to an exemplary embodiment the present invention.

Referring to FIG. 5, a frame buffer 510 stores an input image signal in frame units. For example, the n$^{th}$ frame and n-1$^{th}$ frame are stored in the frame buffer 510.

A motion estimation unit 520 includes a sampling unit 524 and a motion vector detection unit 526 and extracts MVs from sampled M×M blocks. In other words, the sampling unit 524 sub-samples M×M blocks of the n$^{th}$ frame and n-1$^{th}$ frame stored in the frame buffer 510, using a predetermined sampling coefficient. The motion vector detection unit 526 estimated an MV by matching the sampled $M_1 \times M_2$ blocks between the n$^{th}$ frame and n-1$^{th}$ frame in a backward or forward direction.

A motion compensated interpolation unit 240 creates a pixel value to be interpolated between frames by applying the MV detected in the MV detection unit 526 to $N_1 \times N_2$ blocks of the n$^{th}$ frame and n-1$^{th}$ frame stored in the frame buffer 510.

As described above, the amount of computation required for ME is reduced by estimating an MV using sampled ME blocks and image precision can be improved by performing motion compensated interpolation using an estimated MV and non-sampled MCI blocks.

Further, the motion compensated interpolation method can also be embodied as a computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed over network coupled computer systems so that the computer readable code is stored and executed in a distributed fashion.

While the present invention has been particularly shown and described with reference to an exemplary embodiment thereof, it will be understood by those of ordinary skill in the art that various changes in form and details may be made therein without departing from the spirit and scope of the present invention as defined by the following claims.

What is claimed is:

1. A method for motion compensated interpolation, the method comprising:
   (a) storing an input image in frame units;
   (b) dividing pixels of the stored image into $N_1 \times N_2$ blocks and $M_1 \times M_2$ blocks based on the same center axis and sampling pixels in the $M_1 \times M_2$ blocks, wherein $N_1$, $N_2$, $M_1$ and $M_2$ are positive integers, the $M_1 \times M_2$ blocks are larger than the $N_1 \times N_2$ blocks, and adjacent $M_1 \times M_2$ blocks are overlapped with each other;
   (c) estimating a motion vector by matching sampled pixels of the $M_1 \times M_2$ blocks between adjacent frames; and
   (d) creating a mean pixel value between the adjacent frames using the motion vector and pixel values of matched $N_1 \times N_2$ blocks between the adjacent frames.

2. The method of claim 1, wherein in (b), the $M_1 \times M_2$ blocks are motion estimation blocks and the $N_1 \times N_2$ blocks are motion compensated interpolation blocks.

3. The method of claim 1, wherein (c) comprises:
   (c-1) calculating mean absolute differences between sampled base $M_1 \times M_2$ blocks in a current frame and sampled reference $M_1 \times M_2$ blocks in a previous frame; and
   (c-2) determining a minimum mean absolute difference among the mean absolute differences as the motion vector.

4. The method of claim 3, wherein the mean absolute differences MADs are calculated by $$MAD_{(k,l)}(x, y) = \sum_{i=1}^{[M_1/\alpha]} \sum_{j=1}^{[M_2/\alpha]} \frac{\alpha^2 |f_{n-1}(k + \alpha j + y) - f_n(k + \alpha i, l + \alpha j)|}{M_1 \times M_2},$$

where (i, j) indicates spatial coordinates of pixels, (x, y) indicates a spatial distance difference between two blocks to be matched, (k, l) indicates spatial coordinates of two blocks each having $N_1 \times N_2$ pixels, α indicates a sampling coefficient for pixels in blocks for motion estimation, [M/α] is a maximum integer that is not larger than M/α, $M_1 \times M_2$ is a size of each of the blocks for motion estimation, and $M_1$ and $M_2$ are set larger than $N_1$ and $N_2$, respectively.

5. The method of claim 4, wherein in (d), a pixel value $f_i$ of a frame to be interpolated is calculated by $$f_i(k+i, k+j) = \frac{f_{n-1}\left(k+i-\frac{x_m}{2}, l+j-\frac{y_m}{2}\right) + f_n\left(k+i+\frac{x_m}{2}, l+j+\frac{y_m}{2}\right)}{2},$$

where $x_m$ and $y_m$ are vertical and horizontal components of a motion vector for a block having the minimum mean absolute difference.

6. A method for motion estimation, the method comprising:
   (a) storing an input image in frame units;
   (b) dividing pixels of the input image which is stored into $N_1 \times N_2$ blocks and $M_1 \times M_2$ blocks based on a same center axis and sampling pixels in the $M_1 \times M_2$ blocks, wherein $N_1$, $N_2$, $M_1$ and $M_2$ are positive integers, the $M_1 \times M_2$ blocks are larger than the $N_1 \times N_2$ blocks, and adjacent $M_1 \times M_2$ blocks are overlapped with each other; and
   (c) estimating a motion vector by matching sampled pixels of the $M_1 \times M_2$ blocks between adjacent frames.

7. A frame-rate converter that divides pixels of a frame into $N_1 \times N_2$ blocks and $M_1 \times M_2$ blocks based on the same center axis and converts a frame rate, wherein $N_1$, $N_2$, $M_1$ and $M_2$ are positive integers and the $M_1 \times M_2$ blocks are larger than the $N_1 \times N_2$ blocks, the frame-rate coverter comprising:
   a frame buffer which stores an input image in frame units having the $N_1 \times N_2$ blocks and the $M_1 \times M_2$ blocks;
   a motion estimation unit which samples pixels of the $M_1 \times M_2$ blocks stored in the frame buffer and estimates a motion vector by matching the $M_1 \times M_2$ blocks between adjacent frames; and
   a motion compensated interpolation unit which generates a median pixel value between the adjacent frames based on the motion vector estimated in the motion estimation unit and the pixels of the $N_1 \times N_2$ blocks stored in the frame buffer.

8. The frame-rate converter of claim 7, wherein the motion estimation unit comprises:
   a sampling unit which sub-samples pixels of the $M_1 \times M_2$ blocks in an n$^{th}$ frame and an n-1$^{th}$ frame stored in the frame buffer using a predetermined sampling coefficient; and
   a motion vector detection unit which estimates a motion vector by matching pixels of sampled $M_1 \times M_2$ blocks in a backward or forward direction.

* * * * *